UNITED STATES PATENT OFFICE.

JAMES A. McLARTY, OF TORONTO, ONTARIO, CANADA.

TREATMENT OF SULFID ORES.

987,156.  Specification of Letters Patent.  Patented Mar. 21, 1911.

No Drawing.   Application filed March 7, 1910. Serial No. 547,775.

*To all whom it may concern:*

Be it known that I, JAMES A. McLARTY, of the city of Toronto, Province of Ontario, Canada, have invented certain new and useful Improvements in the Treatment of Sulfid Ores.

This invention relates to the treatment of sulfid ores in general, such as sulfids of nickel, cobalt, iron, copper, arsenic, molybdenum and zinc, and particularly to the treatment of nickel ores, my object being to oxidize the sulfids without roasting.

In carrying out my process I first suitably crush or pulverize the ore and if necessary treat it in a suitable concentrator to remove all the unnecessary quartz, gangue, dirt, etc., contained therein. The concentrates are then passed through a magnetic separator which take out the magnetic iron and nickel sulfids. Ordinarily the iron and nickel sulfids are oxidized by roasting; I, however, treat them in a closed chamber with steam preferably saturated and preferably under a pressure of 125 lbs. to the square inch. In the re-action which follows the sulfur of the ore is replaced by the oxygen of the steam and the sulfur itself combines with the hydrogen of the steam to form hydric sulfid ($H_2S$). The nickel oxid thus formed is non-magnetic and with any other non-magnetic oxids may be separated from the iron oxid, which is magnetic, by again passing the mixture through a magnetic separator. The separated oxids may be treated in any suitable manner and the hydric-sulfid also treated for the recovery of the sulfur contained therein.

In the case of sulfids not containing magnetic ores of course the magnetic separation will be omitted. In other respects the treatment will be substantially the same.

What I claim as my invention is:—

1. A process of treating nickel sulfid ores which consists in powdering the ores, passing them through a magnetic separator, subjecting the separated magnetic sulfid ores to the action of steam under pressure, and in passing the oxids thus produced through a magnetic separator to take out any magnetic iron oxid contained therein.

2. A process of treating nickel sulfid ores which consists in demagnetizing the nickel ore and subsequently passing the ore through a magnetic separator to remove any magnetic iron ores contained therein.

3. A process of treating nickel sulfid ores which consists in demagnetizing the nickel ore by the action of heat and oxidation and subsequently passing the ore through a magnetic separator to remove any magnetic iron ores contained therein.

Toronto, Ont., this 4th day of March, 1910.

JAMES A. McLARTY.

Signed in the presence of—
 J. EDW. MABEE,
 E. HALL.